(12) United States Patent
Ishibashi et al.

(10) Patent No.: US 11,665,109 B2
(45) Date of Patent: May 30, 2023

(54) RESOURCE ALLOCATION CALCULATION APPARATUS AND RESOURCE ALLOCATION CALCULATION METHOD TO ENHANCE FAIRNESS AND EFFICIENCY IN ALLOCATION OF RESOURCES AMONG MULTIPLE VIRTUAL NETWORKS WITHIN A PHYSICAL NETWORK

(71) Applicant: NIPPON TELEGRAPH AND TELEPHONE CORPORATION, Tokyo (JP)

(72) Inventors: Keisuke Ishibashi, Musashino (JP); Yoko Hoshiai, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 10 days.

(21) Appl. No.: 17/271,002

(22) PCT Filed: Sep. 18, 2019

(86) PCT No.: PCT/JP2019/036604
§ 371 (c)(1),
(2) Date: Feb. 24, 2021

(87) PCT Pub. No.: WO2020/059763
PCT Pub. Date: Mar. 26, 2020

(65) Prior Publication Data
US 2021/0344615 A1 Nov. 4, 2021

(30) Foreign Application Priority Data

Sep. 21, 2018 (JP) .............................. JP2018-176904

(51) Int. Cl.
*H04L 47/70* (2022.01)
*H04L 47/78* (2022.01)

(52) U.S. Cl.
CPC .......... *H04L 47/823* (2013.01); *H04L 47/781* (2013.01); *H04L 47/822* (2013.01); *H04L 47/828* (2013.01)

(58) Field of Classification Search
CPC ... H04L 47/823; H04L 47/781; H04L 47/822; H04L 47/828
(Continued)

(56) References Cited

U.S. PATENT DOCUMENTS

| 10,193,811 B1* | 1/2019 | Satyanarayana | H04L 45/24 |
| 2009/0059793 A1* | 3/2009 | Greenberg | H04L 45/125 370/235 |

(Continued)

OTHER PUBLICATIONS

T. Uchida, K. Ishibashi and K. Fukuda, "Routing and Capacity Optimization Based on Estimated Latent OD Traffic Demand," 2020 IEEE 44th Annual Computers, Software, and Applications Conference (COMPSAC), 2020, pp. 1169-1175 (Year: 2020).*

(Continued)

*Primary Examiner* — Nicholas R Taylor
*Assistant Examiner* — Chong G Kim
(74) *Attorney, Agent, or Firm* — IPUSA, PLLC

(57) ABSTRACT

A resource allocation calculation device includes: a demand prediction unit that for each of a plurality of virtual networks sharing a physical network, predicts demands in units of communications sharing common origin and destination nodes; and an allocation calculation unit that based on the demands predicted by the demand prediction unit, observed past demands in the units of communications and past allocated bandwidths in the units of communications, calculates allocated bandwidths and allocated routes at a current time for the respective units of communications in such a manner that fairness between utilities of the respective virtual networks is maximized, which enhances fairness and (Continued)

efficiency of allocation of resources to a plurality of virtual networks sharing resources of a physical network.

4 Claims, 4 Drawing Sheets

(58) Field of Classification Search
USPC .......................................................... 709/226
See application file for complete search history.

(56) References Cited

U.S. PATENT DOCUMENTS

2015/0146536 A1* 5/2015 Minei .................... H04L 45/507
370/236
2016/0218917 A1* 7/2016 Zhang ..................... H04L 49/35

OTHER PUBLICATIONS

T. Otoshi et al., "Hierarchical Model Predictive Traffic Engineering," in IEEE/ACM Transactions on Networking, vol. 26, No. 4, pp. 1754-1767, Aug. 2018 (Year: 2018).*
T. Otoshi et al., "Hierarchical traffic engineering based on model predictive control," 2016 International Conference on Computing, Networking and Communications (ICNC), 2016, pp. 1-7 (Year: 2016).*
T. Otoshi et al., "Traffic engineering based on stochastic model predictive control for uncertain traffic change," 2015 IFIP/IEEE International Symposium on Integrated Network Management (IM), 2015, pp. 1165-1170 (Year: 2015).*
N. Kamiyama et al., "Flow aggregation for traffic engineering," 2014 IEEE Global Communications Conference, 2014, pp. 1936-1941 (Year: 2014).*
Y. Takahashi et al., "Separating predictable and unpredictable flows via dynamic flow mining for effective traffic engineering," 2016 IEEE International Conference on Communications (ICC), 2016, pp. 1-7 (Year: 2016).*
Michal Pioro et al., "On Efficient Max-Min Fair Routing Algorithms", IEEE ISCC'03, 2003.
Lucian Popa et al., "Fair Cloud: Sharing the Network in Cloud Computing", ACM SIGCOMM 2012, Aug. 13, 2012.
Ramy Atawia et al., "Fair Robust Predictive Resource Allocation for Video Streaming Under Rate Uncertainties", IEEE GLOBECOM 2016.

* cited by examiner

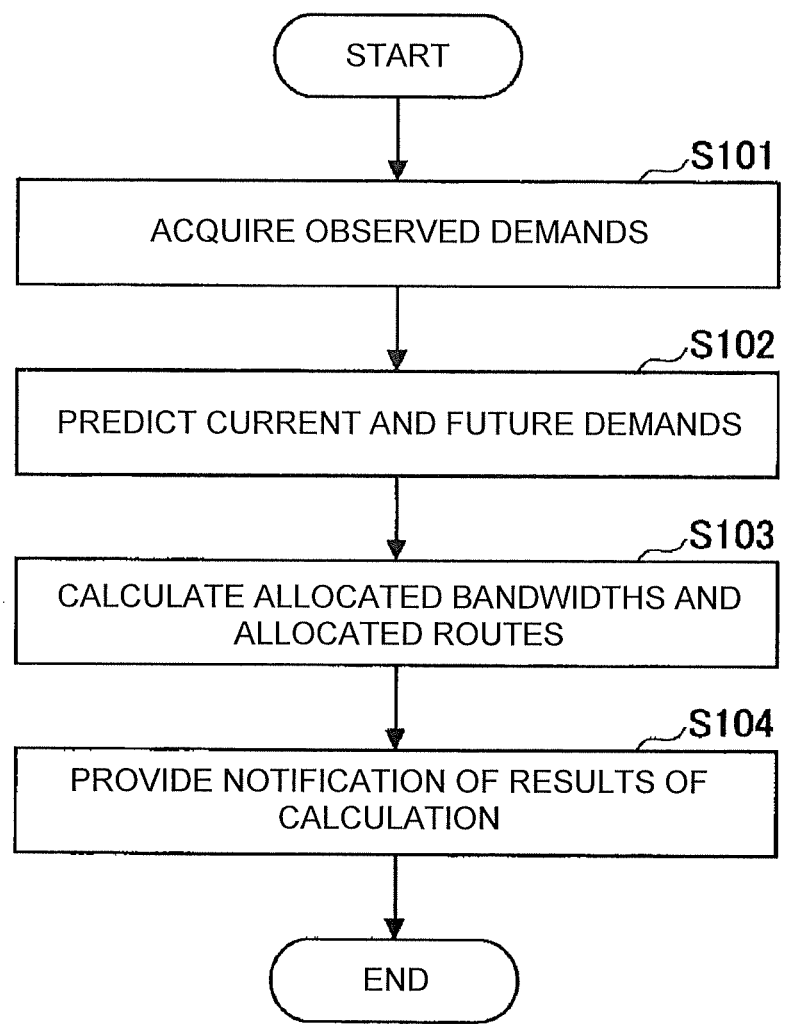

RESOURCE ALLOCATION CALCULATION APPARATUS AND RESOURCE ALLOCATION CALCULATION METHOD TO ENHANCE FAIRNESS AND EFFICIENCY IN ALLOCATION OF RESOURCES AMONG MULTIPLE VIRTUAL NETWORKS WITHIN A PHYSICAL NETWORK

TECHNICAL FIELD

The present invention relates to a resource allocation calculation device and a resource allocation calculation method.

BACKGROUND ART

In recent years, it has become a common practice that on a single physical network, a plurality of virtual network share resources of the physical network to efficiently use the resources. In this case, depending on the amounts of physical resources allocated to the plurality of virtual networks, unfairness may occur among the virtual networks, and thus, a fair allocated amount calculation method is an issue. In particular, where a total of demands for a certain resource on the plurality of virtual networks exceeds a capacity of the resource and the allocated amount inevitably becomes smaller than the demands, and thus, it is necessary to properly allocate resources in view of the demands. On the other hand, as a result of fairness being valued highly, a surplus occurs in a certain resource, causing a decrease in efficiency, and thus, it is necessary to consider efficiency at the same time.

There are various techniques known as fair and efficient resource amount distribution techniques. For example, as typical fairness indexes, there are, e.g., Max-min fairness and proportional fairness, and resource allocation techniques for fulfilling these fairnesses have been known (for example, Non-Patent Literature 1).

CITATION LIST

Non-Patent Literature

Non-Patent Literature 1: Michal Pioro et al., "On Efficient Max-Min Fair Routing Algorithms," IEEE ISCC'03
Non-Patent Literature 2: L. Popa, et al., "FairCloud: Sharing the Network in Cloud Computing," ACM SIG-COMM2012
Non-Patent Literature 3: R. Atawia, et al., "Fair Robust Predictive Resource Allocation for Video Streaming Under Rate Uncertainties," IEEE GLOBECOM 2016

SUMMARY OF THE INVENTION

Technical Problem

However, in the technique in Non-Patent Literature 1, mainly for a bandwidth of a link on a certain network, with communications passing through the link and sharing same origin and destination nodes (hereinafter, communications sharing same origin and destination nodes are referred to as "OD flows") set as a unit, allocated amounts that are fair between OD flows in the link bandwidth are calculated. Where fairness between virtual networks each including a plurality of OD flows is considered, even if fairness is achieved among the individual OD flows, fairness may fail to be achieved between the virtual networks in consideration of all the OD flows.

Non-Patent Literature 2 puts attention on an entirety of a congested channel group in which a total of provided OD flow demands for a plurality of virtual networks exceeds a physical link bandwidth and proposes a technique that makes respective totals of link bandwidth allocated amounts for the congested channel group fair.

However, in Non-Patent Literature 2, allocated bandwidths for respective OD flows are not taken into consideration, and thus, allocated bandwidths for some of the OD flows may become significantly small. Also, in the technique in Non-Patent Literature 2, no temporal fluctuation of demands is assumed. Therefore, even if fairness is achieved between virtual networks at a certain time, fairness may fail to be achieved throughout all service times.

Non-Patent Literature 3 proposes a technique that predicts a necessary bandwidth (demand) for a moving image communication and allocates the bandwidth; however, no fairness between a plurality of communications is taken into consideration. Furthermore, the technique in Non-Patent Literature 3 is premised on the assumption that allocation of demands to resources is fixed.

However, origin and destination nodes of OD flows are fixed but routes of the OD flows between the origin and destination nodes are variable, and therefore, links via which the OD flows pass are also variable. Dynamically changing the routes according to the demands can enable further enhancement in fairness and efficiency. Techniques that dynamically change routes according to demands are known as traffic engineering techniques; however, general traffic engineering techniques are intended to reduce link loads and there are no traffic engineering techniques intended to enhance fairness between virtual networks.

The present invention has been made in view of the above points and an object of the present invention is to enhance fairness and efficiency of allocation of resources to a plurality of virtual networks sharing resources of a physical network.

Means for Solving the Problem

Therefore, in order to solve the aforementioned problems, a resource allocation calculation device includes: a demand prediction unit that for each of a plurality of virtual networks sharing a physical network, predicts demands in units of communications sharing common origin and destination nodes; and an allocation calculation unit that based on the demands predicted by the demand prediction unit, observed past demands in the units of communications and past allocated bandwidths in the units of communications, calculates allocated bandwidths and allocated routes at a current time for the respective units of communications in such a manner that fairness between utilities of the respective virtual networks is maximized.

Effect of the Invention

Fairness and efficiency of allocation of resources to a plurality of virtual networks sharing resources of a physical network can be enhanced.

BRIEF DESCRIPTION OF DRAWINGS

FIG. 4 is a flowchart for describing an example of a processing procedure performed by the resource allocation calculation device 10.

DESCRIPTION OF EMBODIMENTS

Figure 1:
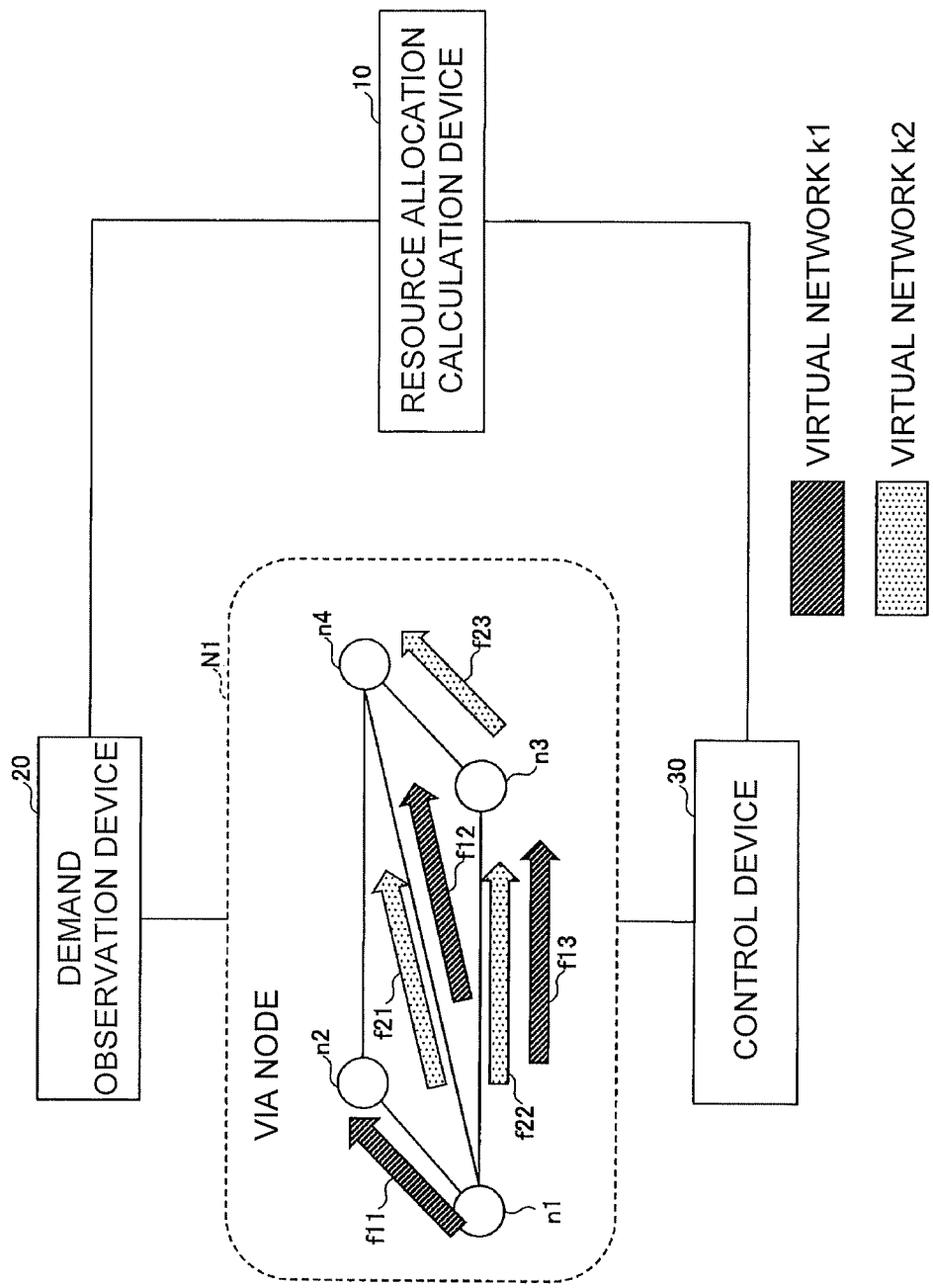
FIG. 1 is a diagram illustrating an example system configuration in a first embodiment.

Embodiments of the present invention will be described below with reference to the drawings. FIG. 1 is a diagram illustrating an example system configuration in a first embodiment. In FIG. 1, a demand observation device 20 and a resource allocation calculation device 10, and the resource allocation calculation device 10 and a control device 30 are connected via respective networks, and function for observation and control of virtual networks on a physical network N1. Alternatively, the demand observation device 20, the resource allocation calculation device 10 and the control device 30 may be implemented using a common computer.

A virtual network refers to a bandwidth and a route allocated to a service or the like provided using a resource of the physical network N1.

The physical network N1 has a configuration of a general network, and includes a plurality of nodes n1 to n4 (hereinafter referred to as "nodes n" where the plurality of nodes n1 to n4 are not distinguished from one another) and links connecting the respective nodes n. Each of the nodes n can be a point of departure or a point of arrival, or a via node of an OD flow.

FIG. 1 illustrates an example in which resources of the physical network N1 are shared by a plurality of (two) virtual networks k1 and k2 (hereinafter referred to as "virtual networks k" where the virtual networks k1 and k2 are not distinguished from each other). The virtual network k1 includes OD flows f11, f12 and f13. The virtual network k2 includes OD flows f21, f22 and f23. An OD flow f refers to a unit of communications sharing common origin and destination nodes in communications on one virtual network k. As is clear from FIG. 1, in the present embodiment, the OD flows f are categorized by virtual network k. Therefore, like the OD flow f12 and the OD flow f21, OD flows f sharing common origin and destination nodes but belonging to different virtual networks k are categorized as different OD flows f. Note that communications sharing common origin and destination nodes means that starting point nodes of the communications are the same and ending point nodes of the communications are the same. It is only necessary that the starting point nodes be the same and the ending point nodes be the same, and respective routes between the starting point nodes and the ending point nodes may be different. Also, the physical network N1 may include none of a terminal, a server and the like that serve as a starting point or an ending point of a communication. In other words, an OD flow f only needs to include communications sharing common origin and destination nodes within the physical network N1.

The demand observation device 20 includes one or more computers that with a total time of use of all the virtual networks k set as $\Delta T$ [seconds], observes the respective virtual networks k on the physical network N1 every $\Delta$ [seconds]. Therefore, each observation time t is a discrete time (t=1, ..., T). The total time of use of all the virtual networks k refers to a period of time during which resources of the physical network N1 are allocated to at least one virtual network k. For example, a time t=1 is a start time of use of a virtual network k, the start time of use of the virtual network k being earliest, and a time T is an ending time of use of a virtual network k, the ending time of use of the virtual network k being latest. The demand observation device 20 observes and stores necessary bandwidths (demanded amounts for communication bandwidths) for the respective OD flows f on each of the virtual networks k at a constant frequency of $\Delta$ seconds, notifies the resource allocation calculation device 10 of the demanded amounts observed every $\Delta$ seconds (hereinafter referred to as "observed demands") or provide the observed demands in response to an observed demand request provided every $\Delta$ seconds from the resource allocation calculation device 10. Note that a general traffic observation device may be used as the demand observation device 20.

The resource allocation calculation device 10 includes one or more computers that calculate an allocated bandwidth and an allocated route for each of the OD flows f on each of the virtual networks k based on results of observation by the demand observation device 20. An allocated bandwidth refers to a bandwidth allocated to an OD flow f for each of links relating to an allocated route of the OD flow f. An allocated route refers to a route (combination of links) allocated to each OD flow f on the physical network N1.

The control device 30 includes one or more computers that perform control (allocation of resources to the respective OD flows f) based on results of calculation by the resource allocation calculation device 10, for the physical network N1. For example, a general network control device such as an SDN (software-defined network) controller may be used as the control device 30.

Figure 2:
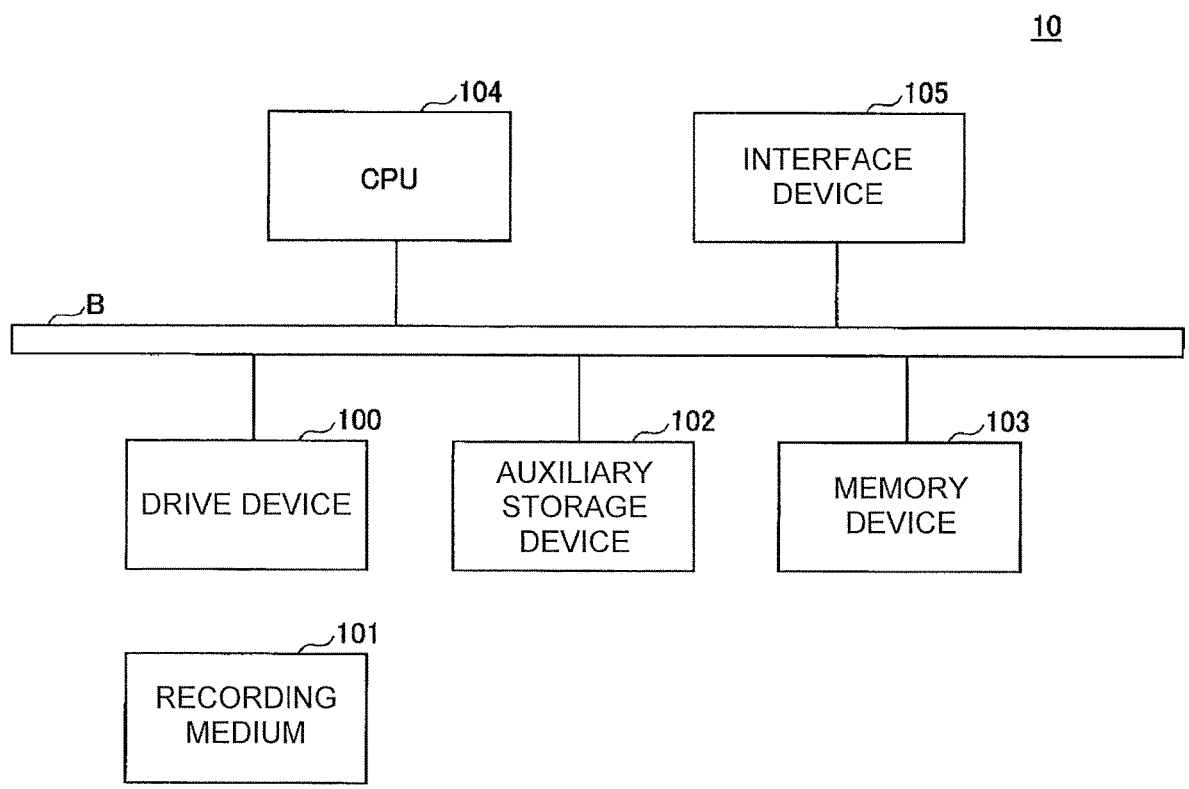
FIG. 2 is a diagram illustrating an example hardware configuration of a resource allocation calculation device 10 in the first embodiment.

FIG. 2 is a diagram illustrating an example hardware configuration of the resource allocation calculation device 10 in the first embodiment. The resource allocation calculation device 10 in FIG. 2 includes, e.g., a drive device 100, an auxiliary storage device 102, a memory device 103, a CPU 104 and an interface device 105 that are mutually connected via a bus B.

A program for implementing processing in the resource allocation calculation device 10 is provided by a recording medium 101 such as a CD-ROM. Upon the recording medium 101 with the program stored therein being set in the drive device 100, the program is installed into the auxiliary storage device 102 from the recording medium 101 via the drive device 100. However, the program does not necessarily need to be installed from the recording medium 101 but may be downloaded from another computer via a network. The auxiliary storage device 102 stores the installed program and also stores necessary files, data and the like.

The memory device 103 reads the program from the auxiliary storage device 102 and stores the program if an instruction for starting the program is provided. The CPU 104 executes functions relating to the resource allocation calculation device 10 according to the program stored in the memory device 103. The interface device 105 is used as an interface for connection to a network.

Figure 3:
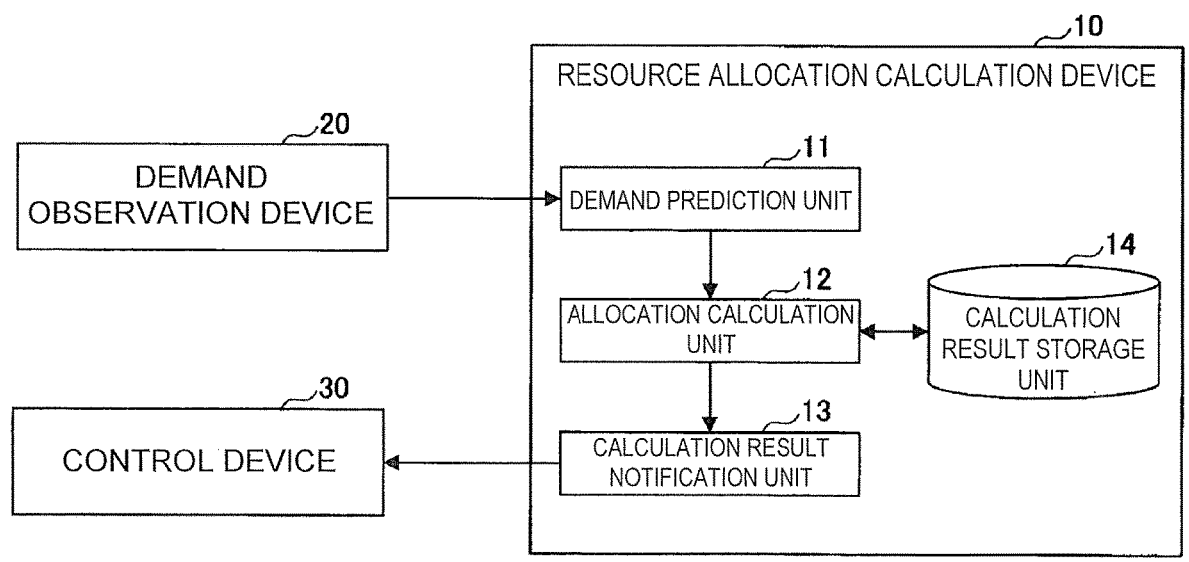
FIG. 3 is a diagram illustrating an example functional configuration of the resource allocation calculation device 10 in the first embodiment.

FIG. 3 is a diagram illustrating an example functional configuration of the resource allocation calculation device 10 in the first embodiment. In FIG. 3, the resource allocation calculation device 10 includes, e.g., a demand prediction unit 11, an allocation calculation unit 12 and a calculation result notification unit 13. These units are implemented by processing performed by the CPU 104 according to one or more programs installed in the resource allocation calculation device 10. The resource allocation calculation device 10 also uses a calculation result storage unit 14. The calculation result storage unit 14 can be implemented, for example, using the auxiliary storage device 102 or e.g., a storage device that is connectable to the resource allocation calculation device 10 via a network.

In the calculation result storage unit 14, results of past calculations (allocated bandwidths and allocated routes for the respective OD flows f on each of the virtual networks k) by the resource allocation calculation device 10 (allocation calculation unit 12) are stored by past time t.

A processing procedure performed by the resource allocation calculation device 10 will be described. FIG. 4 is a flowchart for describing an example of a processing procedure performed by the resource allocation calculation device 10. Note that the processing procedure in FIG. 4 is performed every Δ [seconds](that is, in a cycle of observation by the demand observation device 20).

In step S101, the demand prediction unit 11 acquires observed demands for the respective OD flows f on each of the virtual network k at times $\{1 \ldots t_{now}-1\}$ from the demand observation device 20. Here, $t_{now}$ is a current time. Therefore, observed demands at the respective past times t up to Δ[seconds] before the current time. Acquisition of the observed demands may be performed in response to a request from the demand prediction unit 11 to the demand observation device 20 or may be performed in response to notification from the demand observation device 20.

Subsequently, the demand prediction unit 11 predicts (calculates) predicted values of demands d (k, t, f) (future demands) for the respective OD flows f on each of the virtual networks k at each of current and future times $t=t_{now}, \ldots T$, from the acquired observed demand by means of a proper chronological prediction method, for example, ARIMA modeling or Kalman filtering (S102). Alternatively, the demand prediction unit 11 may predict the future demands using external information other than the observed demands, for example, the number of users of each virtual network k.

Subsequently, for the OD flows f on each of the virtual networks k, the allocation calculation unit 12 calculates allocated bandwidths and allocated routes that achieve fairness among the OD flows f and efficiency (S103). Here, an allocated bandwidth for an OD flow f at a time t on a virtual network k is denoted as x(k, t, f). Also, a matrix indicating an allocated route of each OD flow f at the time t on the virtual network k is denoted as A(k, t). In other words, where R is a set of all the links on the network N1, #R is the number of elements of R, F is a set of all the OD flows f (the OD flows f11 to f13 and the OD flows f21 to f23 in FIG. 1) and #F is the number of elements of F, A(k, t)={a(k, t)$_{rf}$} is set as a matrix of #R×#F and the element a(k, t)$_{rf}$ of the matrix is set as a ratio of OD flows f passing through a link r in the OD flows f at a time t on a virtual network k. Note that x(k, t, f) at each of respective past times t and A(k, t) at each of the respective past times t for each of the virtual networks k and each of the OD flows f are stored in the calculation result storage unit 14.

Based on the observed past demands d(k, t, f), $t=1 \ldots t_{now}-1$ acquired from the demand observation device 20, the past allocated bandwidths x(k, t, f), $t=1 \ldots t_{now}-1$ stored in the calculation result storage unit 14 and the future demand d(k, t, f), $t=t_{now} \ldots T$ predicted by the demand prediction unit 11, the allocation calculation unit 12 calculates x(k, $t_{now}$, f) and A(k, $t_{now}$) in such a manner that fairness and efficiency are achieved. An example method of the calculation can be a method in which x(k, t, f) and A(k, t) are calculated as a solution of the below optimization problem.

$$\max_{x(k,t,f),A(k,t)} FI(\{U_k\}_k) \quad \text{[Formula 1]}$$

Subject to $U_k = F(\{x(k, t, f)\}_{t,f}, \{d(k, t, f)\}_{t,f})$ $$\sum_{k \in K} \sum_{r \in R_i} a(k, t)_{rf} x(k, t, f) \le C_r$$

$x(k, t, f) \ge 0$

Here, K is a set of virtual networks k, $C_r$ is a capacity of the link r. Also, $U_k$ is a utility of a virtual network k and is calculated based on demands d(k, t, f) and allocated bandwidths x(k, t, f) at respective times $t \in \{1, \ldots T\}$ for the respective OD flows f∈F. In other words, an utility of a virtual network k is an index that becomes larger as the allocated bandwidths x(k, t, f) are larger relative to the demands d(k, t, f).

An example of a method of calculation of $U_k$ can be a method in which $U_k$ is obtained as a sum of the utilities calculated at the respective times t for the each of the OD flows f according to the below formula.

$$F(\{x(k, t, f)\}_{t,f}, \{d(k, t, f)\}_{t,f}) = \sum_t \sum_f U_k(x(k, t, f), d(k, t, f)) \quad \text{[Formula 2]}$$

Here, $U_k$(x, d) is a function indicating a utility of a virtual network k where x is an allocated bandwidth relative to a demand d. Various functions can be assumed as the utility function, and an example of the utility function can be the below function having a logistic function shape.

$$U_k(x,d)=1-\exp(1-ax/d) \quad \text{[Formula 3]}$$

Here, a is a parameter for calculating a shape of a logistic curve. Also, FI($U_k$) is a function indicating fairness where $U_k$ is the utility of each virtual network k. There are also various functions known as fairness functions and an example of the fairness functions can be the below function that maximizes the product of the utilities.

$$FI(\{U_k\}_k) = \prod_k U_k \quad \text{[Formula 4]}$$

This is a fairness function taking advantage of, under the condition that the sum of a plurality of variables is constant, the product becoming larger as a difference between the variables is smaller.

Note that the allocation calculation unit 12 makes the allocated bandwidths x(k, $t_{now}$, f) and the allocated routes A(k, $t_{now}$) at the current time for the respective OD flows on each of the virtual networks k, which are results of the calculation, be stored in the calculation result storage unit 14.

Subsequently, the calculation result notification unit 13 notifies the control device 30 of the allocated bandwidths x (k, $t_{now}$, f) and the allocated routes A (k, $t_{now}$) at the current time for the respective OD flows on each of the virtual networks k, which are results of the calculation by the allocation calculation unit 12 (S104). Upon being notified of the calculation results, the control device 30 controls the network N1 so that the allocated bandwidths x (k, $t_{now}$, f) and the allocated routes A (k, $t_{now}$) are allocated to the respective virtual networks.

As described above, according to the first embodiment, where a plurality of virtual networks share resources of a same physical network, it is possible to calculate not only resource allocation amounts (allocated bandwidths) but also routes of the respective OD flows simultaneously in view of all OD flows forming demands for the virtual networks and a total time of use of the virtual networks. Also, in that calculation, fairness between utilities of the virtual networks is taken into consideration. Therefore, fairness and efficiency of resource allocation to the plurality of virtual networks sharing resources of the physical network can be enhanced.

Next, a second embodiment will be described. In the second embodiment, differences from the first embodiment will be described. The second embodiment may be similar to the first embodiment in terms of points not specifically mentioned.

Although in the first embodiment, the utilities of the virtual networks k are treated fairly, in the second embodiment, weights are provided to utilities of virtual networks k in view of, e.g., degrees of importance or charged amounts for the virtual networks k. For a method of providing weights, e.g., a method in which in a fairness function FI, as in the below formula, a weight $w_k$ is given to a utility $U_k$ of each virtual network k (different weights are provided to utilities $U_k$ of the respective virtual networks k) is conceivable. In other words, an allocation calculation unit 12 calculates a fairness FI based on the following formula and calculates x(k, t, f) and A(k, t) based on the fairness FI.

$$FI(\{U_k\}_k) = \prod_k \left(\frac{U_k}{\min_k U_k}\right)^{\frac{1}{w_k}} \quad \text{[Formula 5]}$$

Here, use of a minimum value of $U_k$ for normalization is intended to make a utility of each of all the virtual networks k have a value that is no less than 1, and for enhancement in fairness, it is necessary to make a utility $U_k$ of a virtual network k larger as the weight $w_k$ of the virtual network k is larger, by multiplying the normalized utility by $1/w_k$.

Next, a third embodiment will be described. In the third embodiment, differences from the first or second embodiment will be described. The third embodiment may be similar to the first or second embodiment in terms of points not specifically mentioned.

Although in the first embodiment, a time of use of all the virtual networks k are considered as being limited (up to the time T) and the entire limited time is treated equally, the third embodiment relates to a case where a use time is unlimited. In this case, finding the sum of utilities of a virtual network k at all times causes divergence, and thus, as in the below formula, a utility of a virtual network k of each of times that are far from a current time is subjected to a conversion that causes exponential decay of the utility according to a difference in time from the current time.

$$F(\{x(k, t, f)\}_{t,f}, \{d(k, t, f)\}_{t,f}) = \sum_t \sum_f U_k(x(k, t, f), d(k, t, f))\exp(-|t - t_{now}|) \quad \text{[Formula 6]}$$

In other words, the allocation calculation unit 12 calculates $U_k$ based on the above formula and calculates x(k, t, f) and A(k, t) based on the $U_k$.

Although embodiments of the present invention have been described in detail above, the present invention is not limited to such particular embodiments and various alternations and changes are possible within the scope of the spirit of the present invention stated in the claims.

REFERENCE SIGNS LIST 10 resource allocation calculation device
11 demand prediction unit
12 allocation calculation unit
13 calculation result notification unit
14 calculation result storage unit
20 demand observation device
30 control device
100 drive device
101 recording medium
102 auxiliary storage device
103 memory device
104 CPU
105 interface device
B bus

The invention claimed is:

1. A resource allocation calculation device comprising:
a processor; and
a memory storing program instructions that cause the processor to
predict demands in units of communications sharing common origin and destination nodes for each of a plurality of virtual networks sharing a physical network;
calculate currently allocated bandwidths and allocated routes to maximize fairness between utilities of the respective virtual networks for the respective units of communications based on the predicted demands, observed past demands, and past allocated bandwidths in the units of communications of the communications sharing common origin and destination nodes; and
cause exponential decay of the utilities of the virtual networks at respective times according to differences of the respective times from a current time, wherein the demands in the units of communications sharing common origin and destination nodes are categorized according to each virtual network of the plurality of virtual networks to which the units of communications belong, such that the units of communications sharing common origin and destination nodes, but belonging to different virtual networks, are categorized as different units of communications.

2. The resource allocation calculation device according to claim 1, wherein the program instructions further cause the processor to:
calculate the allocated bandwidths and the allocated route at the current time, with weights provided to the utilities of the respective virtual networks.

3. A resource allocation calculation method comprising:
predicting demands in units of communications sharing common origin and destination nodes for each of a plurality of virtual networks sharing a physical network;
calculating currently allocated bandwidths and allocated routes to maximize fairness between utilities of the respective virtual networks for the respective units of communications based on the demands predicted by the demand prediction unit, observed past demands, and past allocated bandwidths in the units of communications of the communications sharing common origin and destination nodes; and causing exponential decay of the utilities of the virtual networks at respective times according to differences of the respective times from a current time, wherein the demands in the units of communications sharing common origin and destination nodes are categorized according to each virtual network of the plurality of virtual networks to which the units of communications belong, such that the units of communications sharing common origin and destination nodes, but belonging to different virtual networks, are categorized as different units of communications.

4. The resource allocation calculation method according to claim 3, wherein the calculating of the allocated bandwidths further comprises:

calculating the allocated bandwidths and the allocated route at the current time, with weights provided to the utilities of the respective virtual networks.

\* \* \* \* \*